(12) United States Patent
Shudo et al.

(10) Patent No.: US 7,502,220 B2
(45) Date of Patent: Mar. 10, 2009

(54) PORTABLE-TYPE DISPLAY DEVICE

(75) Inventors: Tomoyuki Shudo, Tokyo (JP); Ryota Uchino, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/507,151

(22) PCT Filed: Dec. 11, 2003

(86) PCT No.: PCT/JP03/15883

§ 371 (c)(1), (2), (4) Date: Sep. 7, 2004

(87) PCT Pub. No.: WO2004/064361

PCT Pub. Date: Jul. 29, 2004

(65) Prior Publication Data

US 2005/0140649 A1 Jun. 30, 2005

(30) Foreign Application Priority Data

Jan. 8, 2003 (JP) ............................. 2003-002657

(51) Int. Cl.
 *G06F 1/16* (2006.01)
(52) U.S. Cl. ............... 361/683; 16/255; 379/433.11; 455/575.1
(58) Field of Classification Search ......... 361/679–683; 16/255–259; 379/433.11, 433.12, 433.13; 455/575.1
See application file for complete search history.

(56) References Cited

U.S. PATENT DOCUMENTS 5,485,517 A * 1/1996 Gray ..................... 379/433.13
5,659,361 A * 8/1997 Jin ............................. 348/375
6,658,272 B1 * 12/2003 Lenchik et al. .......... 455/575.1
6,701,162 B1 * 3/2004 Everett ..................... 455/556.1

(Continued)

FOREIGN PATENT DOCUMENTS

JP 60-21636 2/1985

(Continued)

*Primary Examiner*—Jayprakash N Gandhi
*Assistant Examiner*—Anthony Q Edwards
(74) *Attorney, Agent, or Firm*—Frommer Lawrence & Haug LLP; William S. Frommer; Thomas F. Presson (57) ABSTRACT

The portable display apparatus (1) includes a main body (10) substantially in the form of a rectangular solid, and a cover having a support portion (30) and a display portion (40) arranged along the longitudinal direction thereof. The support portion (30) is coupled to the main body (10) at a position apart from the center along the longitudinal direction thereof through a first axis that is perpendicular to the main surface of the main body (10), and can pivot around the first axis on the main surface of the main body (10). On the other hand, the display portion (40) is coupled to the support portion (30) through a second axis that is perpendicular to the first axis, and can pivot around the second axis. When taking a look at image/video data of a memory card 2, the support portion (30) is rotated by approximately 90 degrees around the first axis and the display portion (40) is rotated by approximately 180 degrees around the second axis so that the operating surface of the main body (10) and a liquid crystal display panel (43) can be seen from the same direction.

17 Claims, 8 Drawing Sheets

U.S. PATENT DOCUMENTS

| | | | |
|---|---|---|---|
| 6,726,106 B1 * | 4/2004 | Han et al. | 235/472.01 |
| 6,728,557 B1 * | 4/2004 | Tracy et al. | 455/575.3 |
| 6,850,784 B2 * | 2/2005 | SanGiovanni | 455/575.1 |
| 7,037,443 B2 * | 5/2006 | Shuto et al. | 252/299.01 |
| 2001/0004269 A1 * | 6/2001 | Shibata et al. | 348/333.06 |

FOREIGN PATENT DOCUMENTS

| | | |
|---|---|---|
| JP | 10-312334 | 11/1998 |
| JP | 2000-69158 | 3/2000 |
| JP | 2000 169720 | 6/2000 |
| JP | 2000-196720 | 7/2000 |
| JP | 2001-169166 | 6/2001 |
| JP | 2002-9907 | 1/2002 |
| JP | 2002 135380 | 5/2002 |
| JP | 2002-330203 | 11/2002 |

* cited by examiner

PORTABLE-TYPE DISPLAY DEVICE

TECHNICAL FIELD

The present invention relates to a portable display apparatus for displaying image/video data stored in a memory card or a detachable semiconductor storage medium etc. on a liquid crystal display panel.

This application claims priority of Japanese Patent Application No. 2003-002657, filed on Jan. 8, 2003, the entirety of which is incorporated by reference herein.

BACKGROUND ART

Recently, capacity of memory cards or card-shaped recording media using a semiconductor memory is being increased, which enables storage of audio data and video data of large capacity. Being small in size as compared with tape-shaped recording media or disc-shaped recording media, these memory cards can be used as storage media of portable small-sized electronic equipments intended for mobile use previously.

Figure 1:
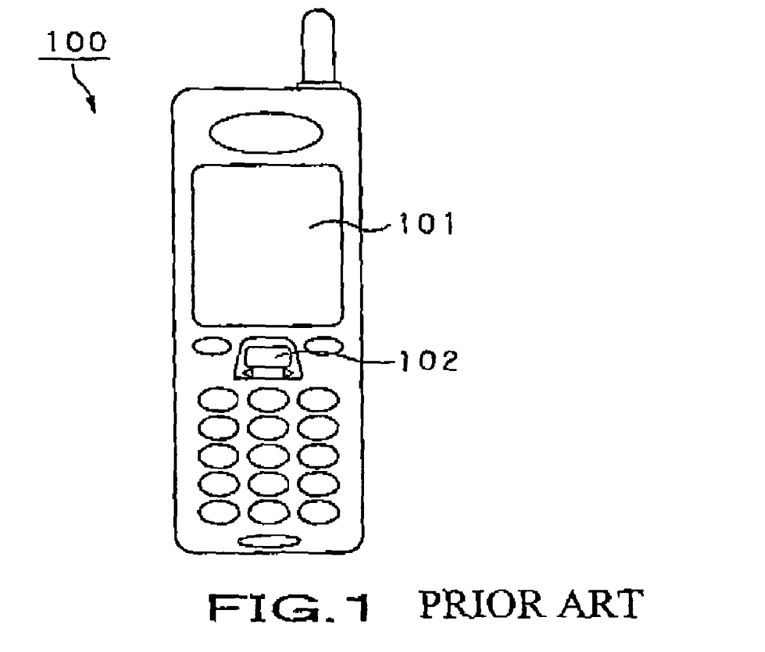
FIG. 1 shows a front view of a conventional cellular phone using a memory card.

As an example of a conventional portable electronic equipment using a memory card as a storage medium, there is known a cellular phone 100 shown in FIG. 1 disclosed in Japanese Laying-Open Patent 2002-57756. The cellular phone 100 shown in FIG.1 has an insertion slot, not shown, into which a memory card having stored therein audio data is inserted, and desired music can be reproduced by operating a rotational push switch 102 to select a title etc. of music displayed on a display unit 101.

Figure 2:
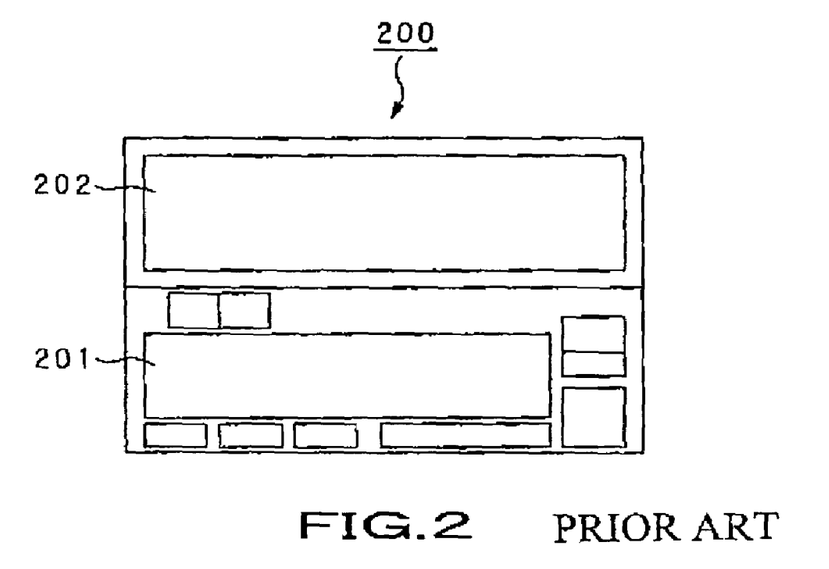
FIG. 2 shows a front view of a conventional electronic dictionary using a memory card.

As another example, other than the cellular phone 100, there is known an electronic dictionary 200 shown in FIG.2 disclosed in Japanese Laying-Open Patent 2001-350792. The electronic dictionary 200 shown in FIG. 2 has an insertion slot, not shown, into which a memory card having stored therein programs etc. for realizing displaying function is inserted, and description or translation of desired words can be displayed on a display unit 202 by operating character keys 201.

It is assumed that image/video data with its aspect ratio set to be 16:9 corresponding to wide aspect ratio is displayed on a display unit of these portable electronic equipments. In case of the cellular phone 100 shown in FIG. 1 whose vertical length is longer than its horizontal length, the longitudinal side of a display unit may be arranged along either the horizontal direction or the vertical direction of the cellular phone 100. In the former case, the image/video data undesirably becomes small, while in the latter case, the cellular phone 100 undesirably has to be inclined by 90 degrees so as to take a look at the image/video data.

On the other hand, in case of the electronic dictionary 200 shown in FIG. 2 whose horizontal length is longer than its vertical length, the longitudinal side of a display unit can be arranged along the horizontal direction of the electronic dictionary 200, which makes it possible to take a look at the image/video data naturally. However, the electronic dictionary 200 cannot be well gripped, and lacks one-handed operationality.

DISCLOSURE OF THE INVENTION

Accordingly, the present invention has an object to overcome the above-mentioned drawbacks of the prior art by providing a portable display apparatus that can be well gripped and make it possible to take a look at image/video data of wide aspect ratio naturally.

The above object can be attained by providing a portable display apparatus including a main body substantially in the form of a rectangular solid, and a cover that has its one surface facing the main body made to have substantially the same dimensions as those of the main surface of the main body, wherein the cover has a support portion and a display portion arranged along the longitudinal direction thereof, and the support portion is coupled to the main body at a position apart from the center along the longitudinal direction thereof through a first axis that is perpendicular to the main surface of the main body, and can pivot around the first axis on the main surface of the main body, and the display portion has arranged thereon a display panel facing the main body, and is coupled to the support portion through a second axis that is perpendicular to the first axis, and can pivot around the second axis.

The display panel has its aspect ratio set to be 16:9, and the longitudinal direction of the display panel corresponds to the longitudinal direction of the main body before being pivoted.

The display panel displays data stored in a semiconductor storage medium such as a detachable memory card.

According to the portable display apparatus of the present invention, when taking a look at image/video data, the support portion is rotated around the first axis and the display portion is rotated around the second axis so that the main surface of the main body and the liquid crystal display panel can be seen from the same direction.

These objects and other objects, features and advantages of the present invention will become more apparent from the following detailed description of the preferred embodiments of the present invention.

BRIEF DESCRIPTION OF THE DRAWINGS

FIG. 9A and FIG. 9B show pivot motion of a display portion coupled to a support portion when using the portable display apparatus, and FIG. 9A shows a front view while

BEST MODE FOR CARRYING OUT THE INVENTION

Figure 3:
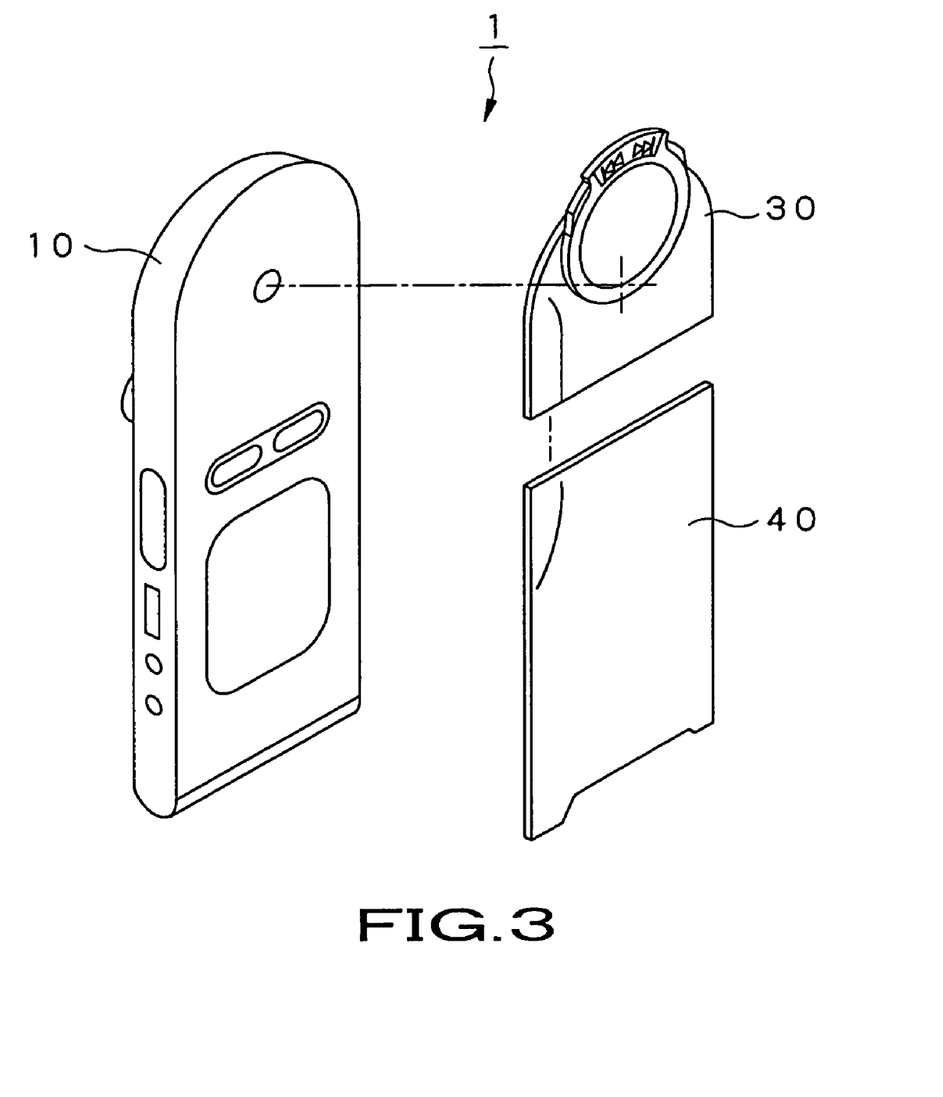
FIG. 3 shows an exploded perspective view of a portable display apparatus according to the present invention.

The present invention will further be described below concerning the best modes with reference to the accompanying drawings. The present invention is applied to a portable display apparatus that displays video data stored in a memory card, which is a detachable semiconductor storage medium, on a liquid crystal display panel. FIG. 3 shows an exploded perspective view of a portable display apparatus 1 according to the present invention, and FIG. 4 and FIG. 5 show a front view and a rear view of the portable display apparatus 1 respectively.

As shown in FIG. 3, the portable display apparatus 1 includes a main body 10 substantially in the form of a rectangular solid whose one end along the longitudinal direction is substantially rounded, and a cover having a support portion 30 and a display portion 40. The cover has its one surface facing the main body 10 made to have substantially the same dimensions as those of the main surface of the main body 10. The portable display apparatus 1 has its shape and dimensions so designed as to be well gripped by one-hand, and the main surface of the main body 10 and the main surface of the cover faces each other, as shown in FIG. 4 and FIG. 5. In the following explanation, the substantially rounded end is defined to be upper end, while the other side is defined to be lower end, since the portable display apparatus 1 is gripped and used this way.

Figure 6:
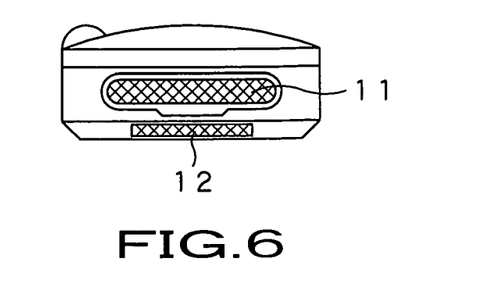
FIG. 6 shows a bottom view of the portable display apparatus.
Figure 7:
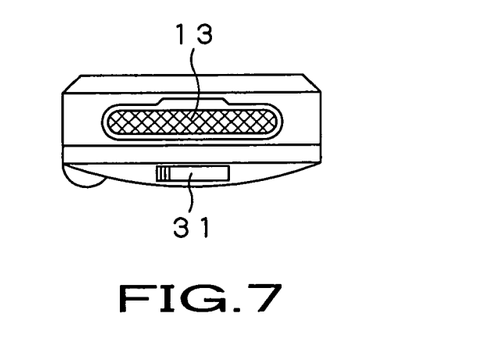
FIG. 7 shows a plan view of the portable display apparatus.

The main body 10 has formed at the lower end thereof an insertion slot 11 into which a memory card 2 is inserted, and a charge terminal 12 which is set on a battery charger (cradle) etc. to charge the portable display apparatus 1, as shown in a bottom view or FIG. 6. On the other hand, the main body 10 has formed at the upper end thereof an insertion slot 13 into which a memory card 3 having pickup function is inserted, as shown in a plan view or FIG. 7.

Figure 4:
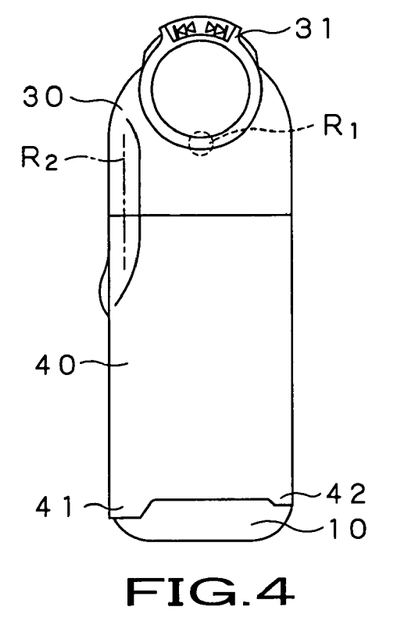
FIG. 4 shows a front view of the portable display apparatus.
Figure 5:
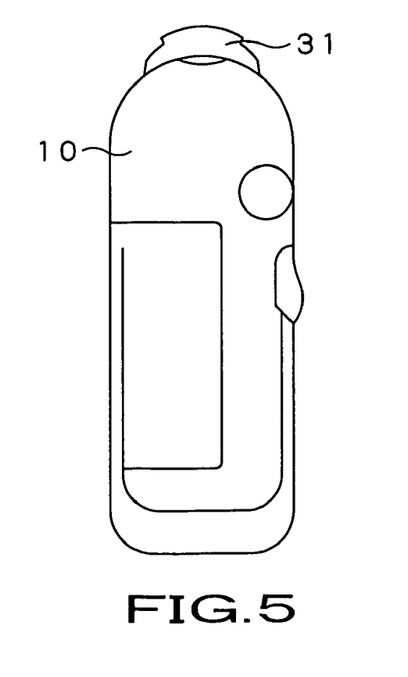
FIG. 5 shows a rear view of the portable display apparatus.

On the other hand, the cover has a slight protrusion arranged at the substantially rounded upper end thereof, or at the upper end of the support portion 30, along part of the rounded portion, and a rotational operation switch 31 to be described later is arranged on the protrusion, as shown in FIG. 4. The lower end of the cover, or the lower end of the display portion 40, is slightly shortened as compared with the main body 10 along the longitudinal direction, and has arranged at both sides thereof along the direction perpendicular to the longitudinal direction claws 41, 42 that are pulled by a finger.

Figure 8:
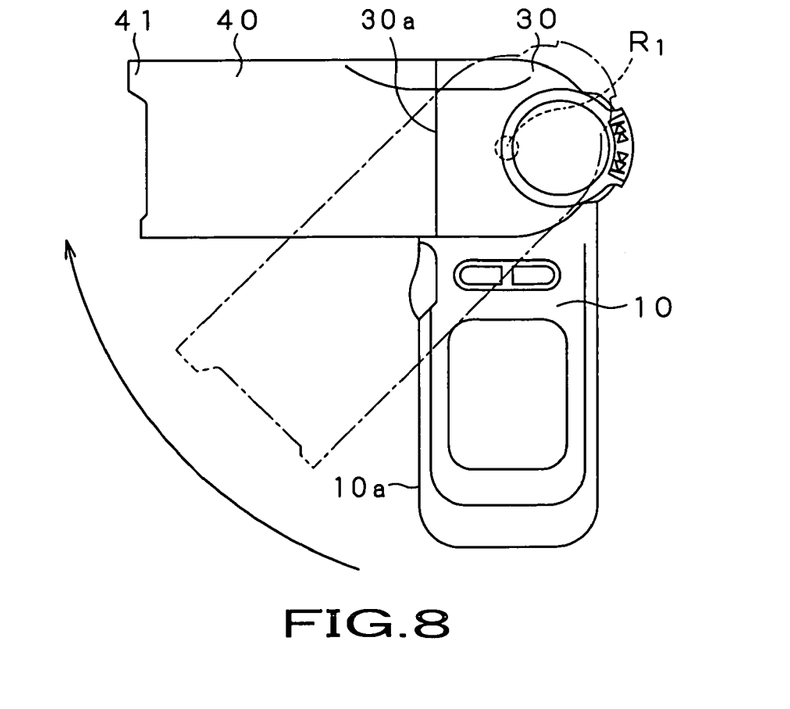
FIG. 8 shows pivot motion of a cover coupled to a main body when using the portable display apparatus.

The cover, which has the support portion 30 and the display portion 40, is coupled to the main body 10 through a first axis that is arranged substantially at the center $R_1$ of the rounded portion, as shown in FIG. 4. As shown in a front view or FIG. 8, the cover can pivot clockwise (right-handed direction in FIG. 8) around the first axis that is arranged substantially at the center $R_1$ of the rounded portion on the main surface of the main body 10 over approximately 90 degrees, and is temporarily tightened when rotated by 90 degrees. At this time, it is desired that the boundary 30a between the support portion 30 and the display portion 40 be located on the left side 10a of the main body 10. The cover can be made to pivot around the first axis by pulling the claw 41 arranged at the cover 40. The main surface of the main body 10 and the main surface of the cover, which face each other, are made substantially flat and have no protrusion so as not to prevent the cover from pivoting around the first axis.

Figure 9A:
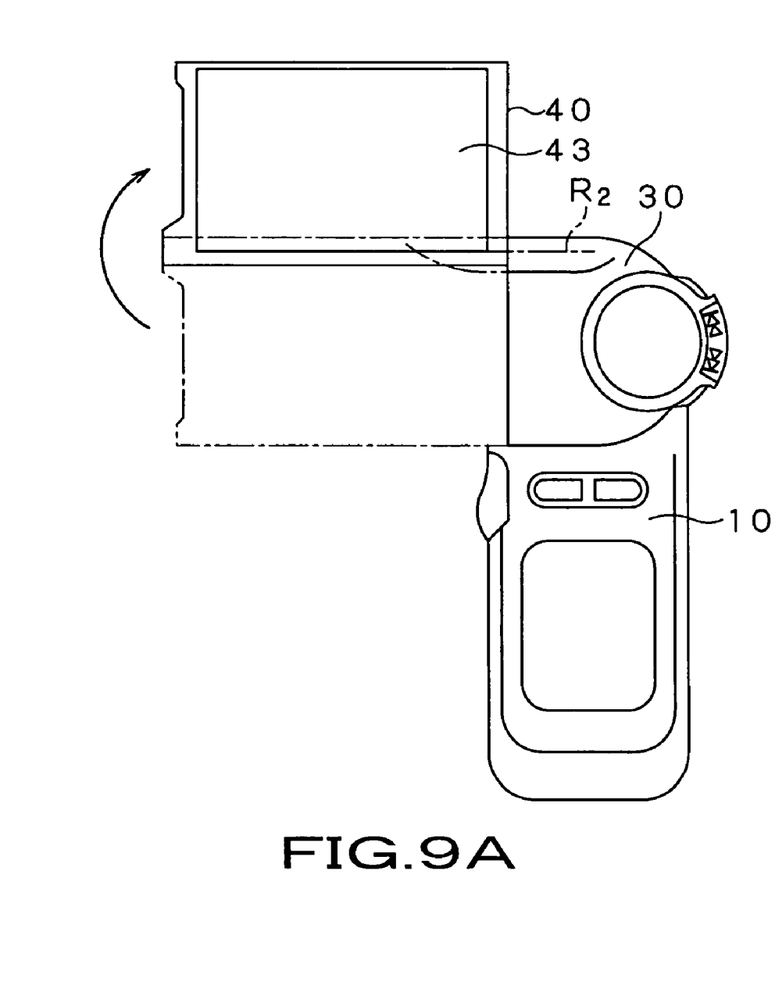
Figure 9B:
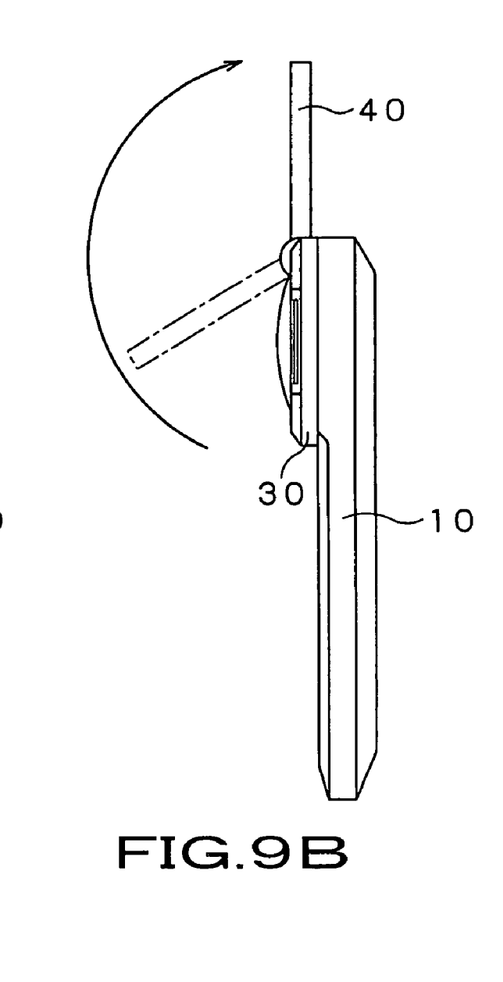
FIG. 9B shows a right side view.

Furthermore, the support portion 30 and the display portion 40 are coupled to each other through a second axis $R_2$ located at the left side of the cover, which corresponds to the pivot direction of the cover around the first axis, as shown in FIG. 4. As shown in a front view or FIG. 9A and a right side view or FIG. 9B, the display portion 40 can pivot around the second axis $R_2$ over approximately 180 degrees so that a liquid crystal display panel 43 that originally faces the main surface of the main body 10 can be seen when taking a look at the main surface of the main body 10, and is temporarily tightened when rotated by 180 degrees. On the other hand, the display portion 40 may be temporarily tightened when rotated by not only 180 degrees but also other angles so that the inclination of the display portion 40 can be arbitrarily adjusted. The second axis $R_2$ has its diameter made large so as to support the pivoting display portion 40, and a bearing portion through which the second axis $R_2$ passes protrudes from the surface of the cover, as shown in FIG. 9A and FIG. 9B. Furthermore, pivot motion of the second axis $R_2$ is interlocked with a power switch of the portable display apparatus 1, that is, the power switch is turned on when the display portion 40 rotates more than a predetermined angle apart from the support portion 30.

Figure 10:
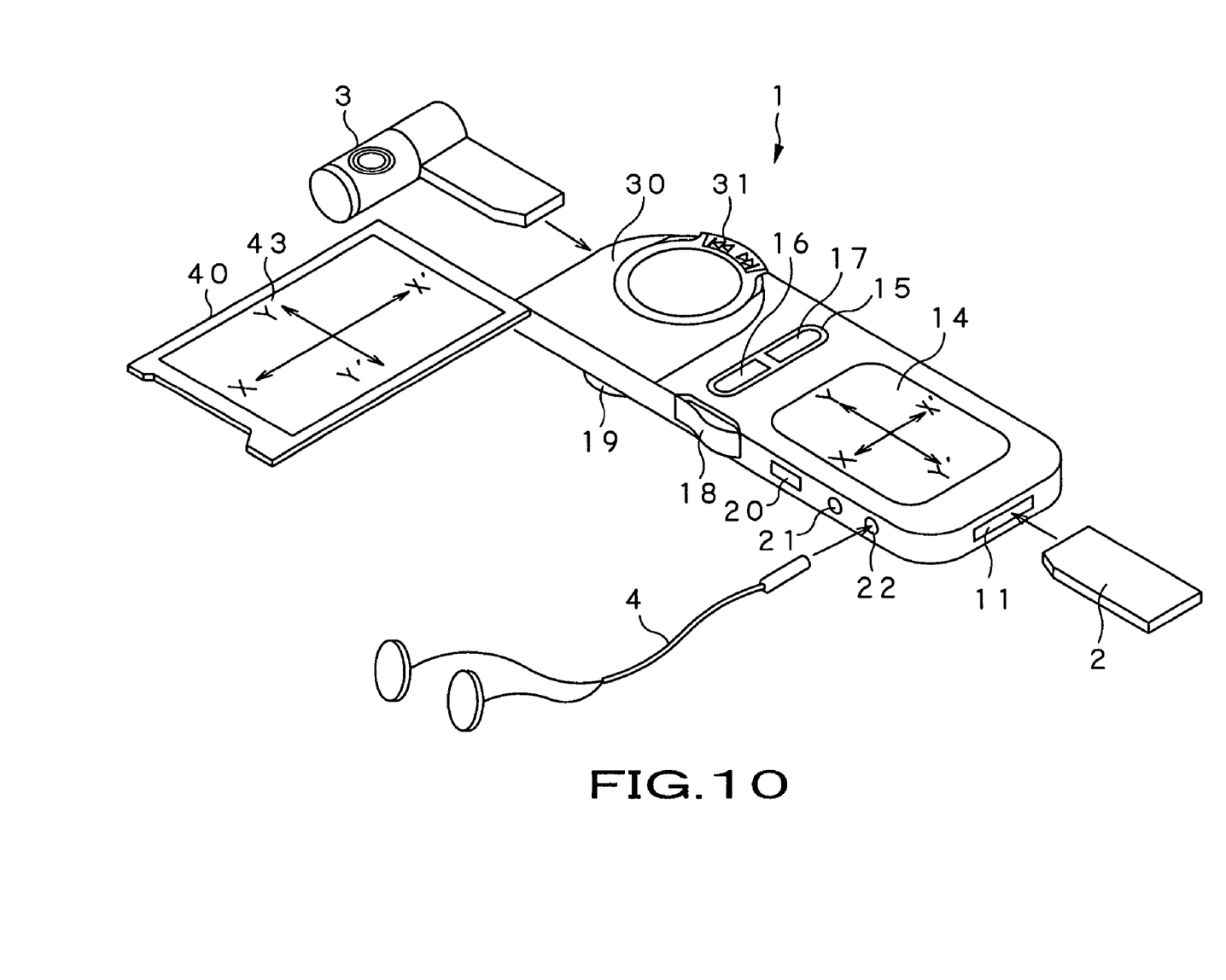
FIG. 10 shows a perspective view of the portable display apparatus, which is in use.

FIG. 10 shows a perspective view of the portable display apparatus 1, which is in use. As shown in FIG. 10, the portable display apparatus 1 has its support portion 30 rotated by approximately 90 degrees around the first axis and has its display portion 40 rotated by approximately 180 degrees around the second axis $R_2$ so that the operating surface or the main surface of the main body 10 and the liquid crystal display panel 43 can be seen from the same direction.

The operating surface of the main body 10 has formed thereon a track pad 14 that is a planate pointing device (small tablet). When touching to operate the track pad 14 along XX' direction shown in FIG. 10, a cursor, not shown, displayed on the liquid crystal display panel 43 also moves along the XX' direction. On the other hand, when touching to operate the track pad 14 along YY' direction shown in FIG. 10, the cursor also moves along the XX' direction. Furthermore, information can be input using the GUI (Graphic User Interface) on the liquid crystal display panel 43.

A plurality of operating buttons such as upward, downward, leftward, and rightward direction keys may be formed instead of forming the track pad 14. On the other hand, forming the track pad 14 is desirable, since the number of parts of the portable display apparatus 1 can be reduced as compared with forming such operating buttons.

Also, the operating surface of the main body 10 has a depression 15 formed on a predetermined position thereof, for example upper position when viewed from the track pad 14, and a menu button 16 and a enter button 17 are arranged in the depression 15. The menu button 16 and enter button 17 are used to change or select information displayed on the liquid crystal display panel 43 using the GUI. The depression 15 is deep enough to prevent the menu button 16 and enter button 17 from protruding from the operating surface of the main body 10.

The main body 10 has formed at the lower end thereof the insertion slot 11 into which the memory card 2 is inserted, and the charge terminal 12 which is set on a battery charger (cradle) etc. to charge the portable display apparatus 1, as described above using FIG. 6. The memory card 2 may be a memory card using a flash EEPROM (Electrically Erasable and Programmable ROM) referred to as an SSFDC (Solid-State Flexible Disc Card) for short, or a semiconductor recording medium that can store at least image/video data such as a miniature card, which has memory capacity of 1 GB.

On the other hand, the main body 10 has formed at the upper end thereof the insertion slot 13 into which the memory card 3 having pickup function is inserted, as described above using FIG. 7. The memory card 3 having pickup function has a pickup element such as a MOS (Metal Oxide Semiconductor) sensor, and can pick up a subject. Being provided with the memory card 3 having pickup function inserted into the insertion slot 13, picked up image data can be stored in the memory card 3, or displayed on the liquid crystal display panel 43. The memory card 3 having pickup function is disclosed in Japanese Laying-Open Patent 2001-142760 suggested previously by the present applicant.

Furthermore, the main body 10 has arranged at the left side thereof, when taking a look at the operating surface, a push switch 18 for reproducing or stopping an image displayed on the liquid crystal display panel 43, and a rotational volume dial 19 for adjusting volume. When holding the portable display apparatus 1 with the right hand, the push switch 18 and volume dial 19 can be operated by the forefinger. Furthermore, on the left side of the main body 10, there are arranged a data input/output terminal 20 for inputting/outputting data from/to an external computer using the IEEE 1394 interface etc., a line-in terminal 21 for receiving audio/video data from an external AV (Audio/Video) device connected by a cable, and an earphone terminal 22 to which a earphone 4 is connected.

As described above, the support portion 30 can pivot clockwise on the main surface of the main body 10 over approximately 90 degrees, and has a slight protrusion arranged at the substantially rounded upper end thereof along part of the rounded portion. On this protrusion, there is arranged the rotational operation switch 31 that can pivot slightly along the rounded portion, and an image displayed on the liquid crystal display panel 43 can be fast-forwarded or rewound by rotating the rotational operation switch 31. The rotational operation switch 31 is biased toward the center of the rotatable range, and is returned to the center when loosed from a finger after being pivoted slightly. When the support portion 30 is rotated clockwise by approximately 90 degrees, the rotational operation switch 31 comes to the right side of the portable display apparatus 1. Thus, the rotational operation switch 31 can be operated by the thumb when the portable display apparatus 1 is held by the right hand.

The display portion 40 is provided with the liquid crystal display panel 43 that faces the operating surface of the main body 10, and can pivot around the second axis $R_2$ up to approximately 180 degrees so that the liquid crystal display panel 43 can be seen when taking a look at the main surface of the main body 10. The liquid crystal display panel 43 may be a wide panel with its aspect ratio set to be 16:9, and is arranged over the whole area of the display portion 40 so as to effectively use the area thereof.

The configuration of the portable display apparatus 1 is not restricted to above-described example. For example, the support portion 30 and the display portion 40 are coupled to each other through a second axis $R_2$ located at the left side of the cover, and the cover may pivot counterclockwise around the first axis that is arranged substantially at the center $R_1$ of the rounded portion on the main surface of the main body 10 over approximately 90 degrees. In this case, it is desirable that the push switch 18 and volume dial 19 be arranged at the right side of the main body 10, when taking a look at the operating surface. Thus, when the support portion 30 is rotated counterclockwise by approximately 90 degrees and the portable display apparatus 1 is held by the left hand, the rotational operation switch 31 can be operated by the thumb while the push switch 18 and volume dial 19 can be operated by the forefinger.

Figure 11:
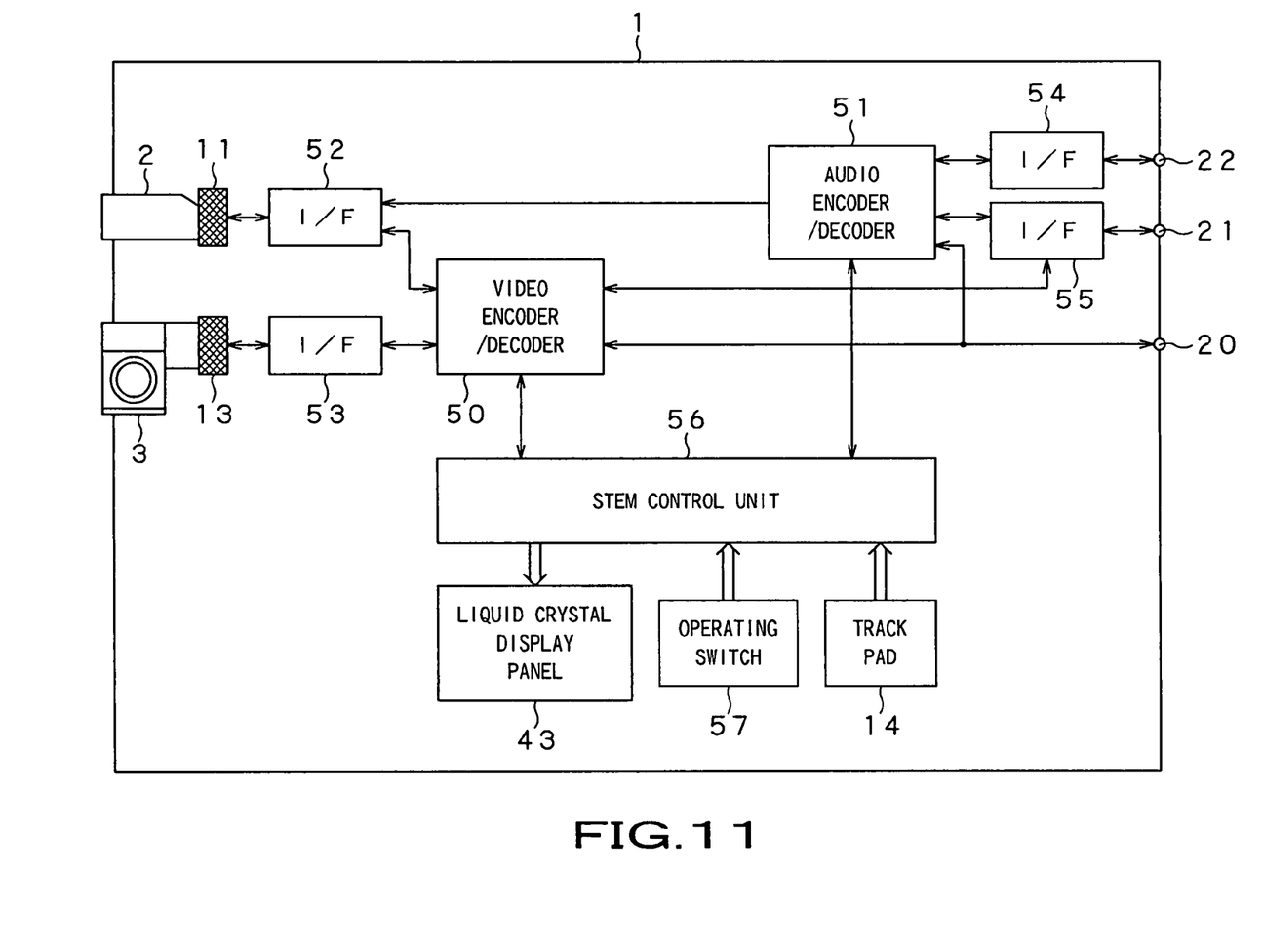
FIG. 11 shows a block diagram of the portable display apparatus.

Next, internal configuration of the portable display apparatus 1 will be explained with reference to a block diagram shown in FIG. 11.

The portable display apparatus 1 includes a video encoder/decoder 50 that performs decode processing for video data stored in the memory card 2. The video encoder/decoder 50 is supplied with video data stored in the memory card 2 that is inserted into the insertion slot 11 through a memory card interface (memory card I/F) 52. The video encoder/decoder 50 performs decode processing such as expansion processing for the video data. The video data that has undergone the decode processing is sent to the liquid crystal display panel 43 through a system control unit 56 to be displayed thereon.

Furthermore, the video encoder/decoder 50 performs decode processing for image data stored in the memory card 3 having pickup function. The video encoder/decoder 50 is supplied with image data stored in the memory card 3 having pickup function that is inserted into the insertion slot 13 through a memory card I/F 53. The video encoder/decoder 50 performs decode processing such as expansion processing for the image data. The image data that has undergone the decode processing is sent to the liquid crystal display panel 43 through the system control unit 56 to be displayed thereon.

The portable display apparatus 1 also includes an audio encoder/decoder 51 that performs decode processing for audio data stored in the memory card 2. The audio encoder/decoder 51 is supplied with audio data stored in the memory card 2 that is inserted into the insertion slot 11 through the memory card I/F 52. The audio encoder/decoder 51 performs decode processing such as expansion processing for the audio data. The audio data that has undergone the decode processing is sent to the earphone terminal 22 through an earphone interface (earphone interface I/F) 54 to be output therefrom.

Furthermore, the video encoder/decoder 50 and the audio encoder/decoder 51 are supplied with video/audio data from outside through the data input/output terminal 20 or the line-in terminal 21. The video encoder/decoder 50 and the audio encoder/decoder 51 perform encode processing such as compression processing for thus input video/audio data. The video/audio data that has undergone the encode processing is sent to the memory card 2 inserted into the insertion slot 11 through the memory card I/F 53 to be stored therein.

The system control unit 56 receives signals from the track pad 14, push switch 18, volume dial 19, menu button 16, enter button 17, rotational operation switch 31, and an operating switch 57. The system control unit 56 controls the respective units of the portable display apparatus 1 based on the signals.

As has been described above, according to the portable display apparatus 1 of the present invention, the longitudinal direction of the liquid crystal display panel 43 is made to correspond to the longitudinal direction of the cover, and, when taking a look at image/video data, the support portion 30 is rotated by approximately 90 degrees around the first axis and the display portion 40 is rotated by approximately 180 degrees around the second axis $R_2$ so that the operating surface of the main body 10 and the liquid crystal display panel 43 can be seen from the same direction, which makes it possible to well grip the portable display apparatus 1 and take a look at image/video data of wide aspect ratio naturally, also improving one-handed operationality.

While the invention has been described in accordance with certain preferred embodiments thereof illustrated in the accompanying drawings and described in the above description in detail, it should be understood by those ordinarily skilled in the art that the invention is not limited to the embodiments, but various modifications, alternative constructions or equivalents can be implemented without departing from the scope and spirit of the present invention as set forth and defined by the appended claims.

Figure 12:
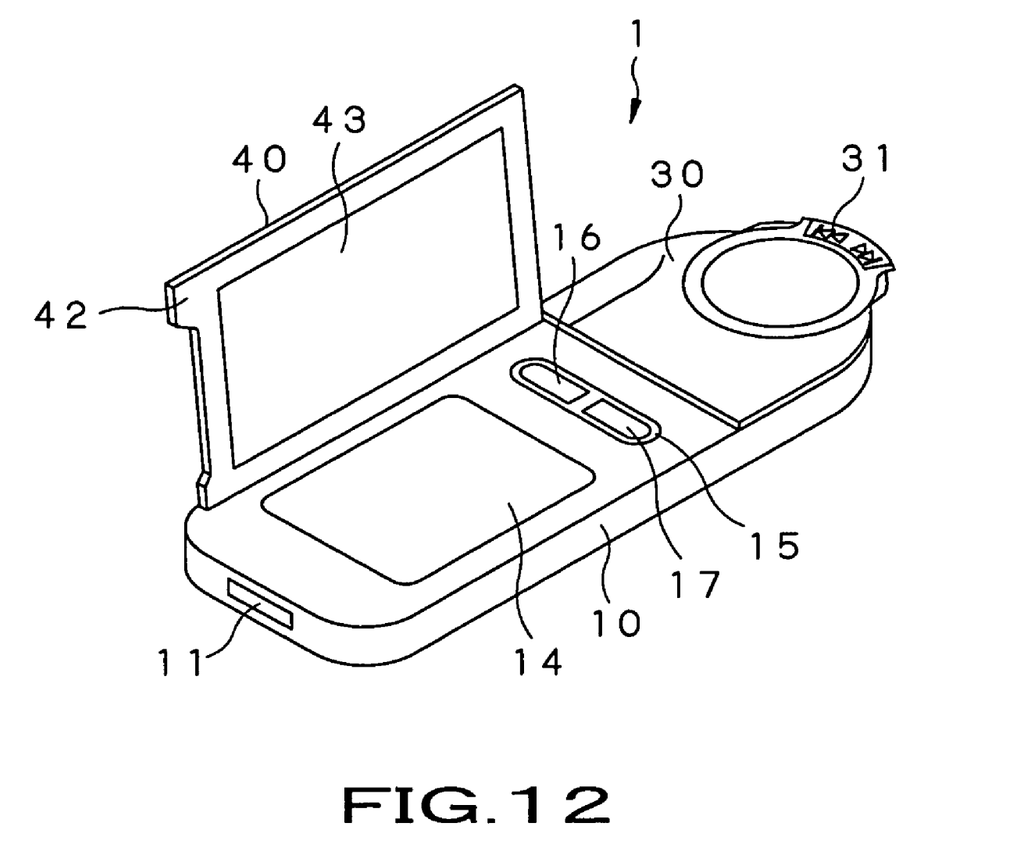
FIG. 12 shows a perspective view of the portable display apparatus, which is in another use.

For example, in above-described embodiment, the support portion 30 is rotated by approximately 90 degrees around the first axis and the display portion 40 is rotated by approximately 180 degrees around the second axis $R_2$ so that the operating surface of the main body 10 and the liquid crystal display panel 43 can be seen from the same direction, as shown in FIG. 10. On the other hand, the present invention is not restricted to this embodiment. That is, in case the portable display apparatus 1 can be set on a desk etc., the display portion 40 alone may be rotated by proper degrees around the second axis $R_2$ so that the operating surface or the main surface of the main body 10 and the liquid crystal display panel 43 can be seen from the same direction, as shown in FIG. 12. The display portion 40 can be rotated around the second axis $R_2$ by pulling the claw 42 thereof with a finger.

Furthermore, in above-described embodiment, video data is stored in the memory card 2 that is a detachable semiconductor storage medium. On the other hand, the present invention is not restricted to this embodiment. That is, the portable display apparatus 1 has built therein a semiconductor storage device in advance. In this case, video data transmitted by wireless may be stored in the semiconductor storage device, and is then displayed on the liquid crystal display panel 43.

INDUSTRIAL APPLICABILITY

According to the present invention, when taking a look at image/video data, the support portion is rotated around the first axis and the display portion is rotated around the second axis so that the main surface of the main body and the liquid crystal display panel whose aspect ratio is 16:9 can be seen from the same direction, which makes it possible to well grip the portable display apparatus and take a look at image/video data of wide aspect ratio naturally.

The invention claimed is:

1. A portable display apparatus comprising:
a main body substantially in the form of a rectangular solid and having a main surface, and a cover that has one surface facing the main body and having substantially the same dimensions as those of the main surface of the main body,
wherein the cover has a support portion and a display portion arranged along a longitudinal direction thereof, and
the support portion is coupled to the main body such that the support portion is pivotable around a first axis, the first axis being perpendicular to the main surface of the main body, and
the display portion has arranged thereon a display panel facing the main body, and is coupled to the support portion such that the display portion is pivotable around a second axis, the second axis being perpendicular to the first axis,
wherein the second axis is along a longitudinal edge of the support portion, and the display portion is rotatable separate from the support portion around the second axis,
wherein the main body has a depression formed therein, the depression adapted to support at least one button and such that the at least one button is covered by the cover when the cover is in a closed position and such that the at least one button is used to change or select information displayed on the display panel,
wherein one end of the main body along the longitudinal direction coupled to the support portion and corresponding one end of the support portion are formed into round shape, and the first axis is located at substantially the center of the rounded portion,
wherein the end of the rounded portion of the support portion has a slight protrusion and arranged thereon an operation unit that controls displaying data on the display panel,
wherein the operation unit is biased toward the center of the rotatable range, and is returned to the center when released from a finger after being pivoted slightly.

2. The portable display apparatus as set forth in claim 1, wherein the display panel has its aspect ratio set to be 16:9, and the longitudinal direction of the display panel corresponds to the longitudinal direction of the main body before being pivoted.

3. The portable display apparatus as set forth in claim 1, wherein the display panel displays data stored in a semiconductor storage medium.

4. The portable display apparatus as set forth in claim 3, wherein the semiconductor storage medium is a detachable memory card.

5. The portable display apparatus as set forth in claim 4, wherein at least one side of the main body has formed thereat an insertion slot into which the memory card is inserted.

6. The portable display apparatus as set forth in claim 1, wherein the second axis is arranged at one side of the cover corresponding to the pivot direction around the first axis.

7. The portable display apparatus as set forth in claim 1, wherein the second axis is interlocked with a power switch of the portable display apparatus, and the power switch is turned on when the display portion rotates more than a predetermined angle.

8. The portable display apparatus as set forth in claim 1, wherein the main surface of the main body has formed thereon a track pad that is a planate pointing device.

9. The portable display apparatus as set forth in claim 1, wherein one side of the main body corresponding to the pivot direction around the first axis has arranged thereon an operation unit that controls displaying data on the display panel.

10. A portable electronic device comprising:
a first body through which a first rotational axis extends, the first rotational axis being perpendicular to the first body,
a second body connected to the first body at the point on the first body through which the first rotational axis extends, said second body including a first portion and a second portion arranged along a longitudinal direction thereof, and further comprising a second rotational axis, said second rotational axis being perpendicular to the first rotational axis and along one edge of the first portion of said second body,
wherein the second portion of said second body is rotatable, separate from the first portion, about the second rotational axis, and wherein said entire second body is rotatable about the first axis away from the first body,
wherein the first body has a depression formed therein, the depression adapted to support at least one button and such that the at least one button is covered by the second body and such that the at least one button is used to change or select information displayed on a display panel attached to an inner surface of the second portion of said second body in a closed position,
wherein one end of the first body along the longitudinal direction coupled to the first portion of the second body and corresponding one end of the first portion of the second body are formed into round shape, and the first axis is located at substantially the center of the rounded portion,
wherein the end of the rounded portion of the first portion of the second body has a slight protrusion and arranged thereon an operation unit that controls displaying data on the display panel,
wherein the operation unit is biased toward the center of the rotatable range, and is returned to the center when released from a finger after being pivoted slightly.

11. The portable electronic device of claim 10, wherein one of the first or second bodies includes a display.

12. The portable electronic device of claim 10, wherein one of the first or second bodies includes a key pad.

13. The portable electronic device of claim 10, wherein one of the first or second bodies includes a track pad.

14. The portable electronic device of claim 10, wherein one of the first or second bodies is configured to receive a memory card.

15. The portable electronic device of claim 10, wherein the second rotational axis is interlocked with a power switch of the portable electronic device, and the power switch is turned on when the second portion of the second body rotates more than a predetermined angle.

16. The portable electronic device of claim 10, wherein the device is a cellular telephone.

17. The portable electronic device of claim 10, wherein the device is a portable dictionary.

* * * * *